JOHN G. MOORE, OF KINGSTON, OHIO.

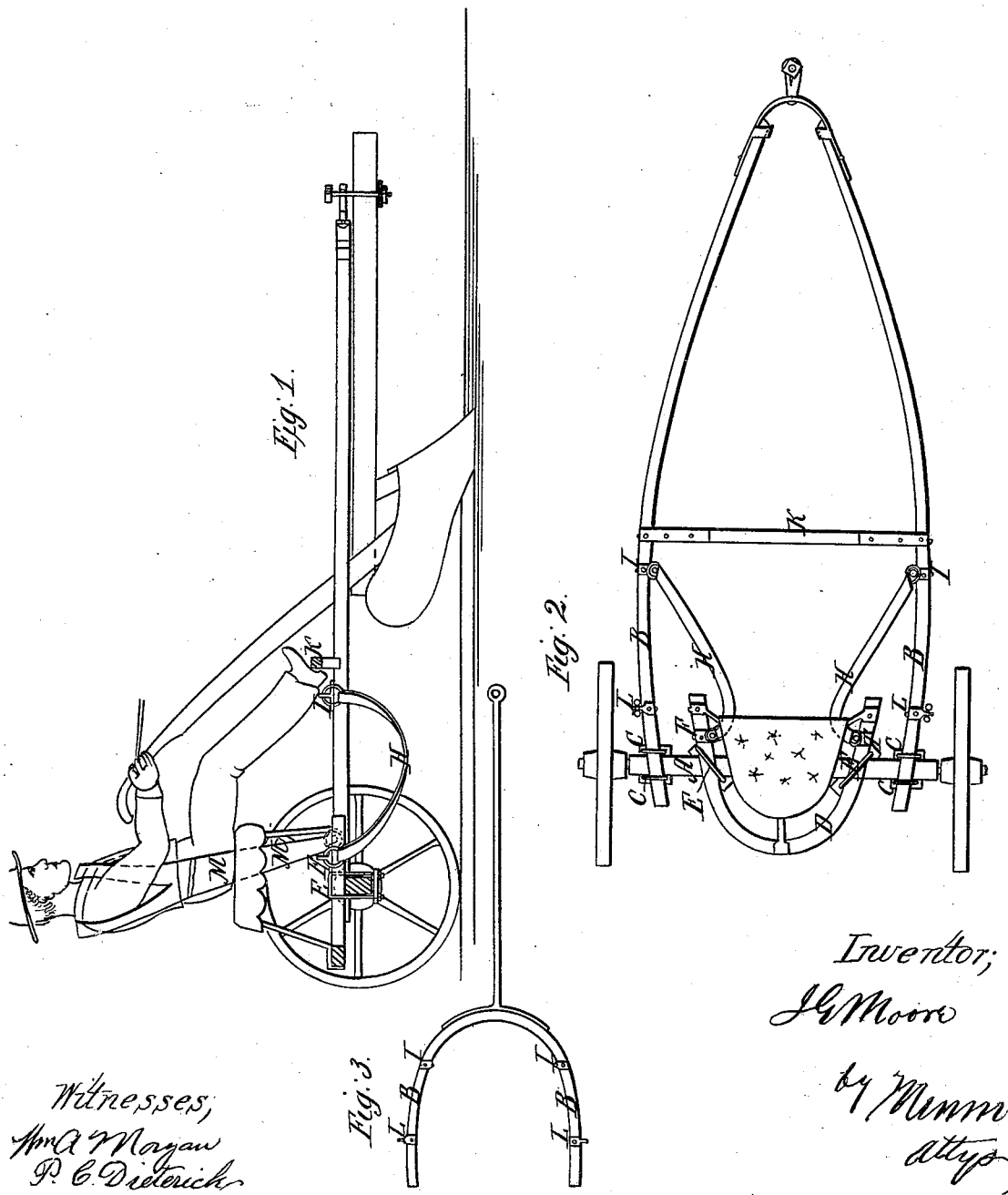

*Letters Patent No. 87,866, dated March 16, 1869.*

IMPROVEMENT IN TRUCK FOR PLOWS.

The Schedule referred to in these Letters Patent and making part of the same.

*To all whom it may concern:*

Be it known that I, JOHN G. MOORE, of Kingston, in the county of Ross, and State of Ohio, have invented a new and improved Truck for Plows, &c.; and I do hereby declare that the following is a full, clear, and exact description thereof, which will enable others skilled in the art to make and use the same, reference being had to the accompanying drawings, forming part of this specification.

This invention relates to improvements in trucks, such as are employed in connection with plows or cultivators, to afford a means for the operator to ride while guiding them, whereby it is designed to provide a simple and cheap truck, more especially adapted for the purpose.

In the accompanying drawings—

Figure 1 represents a side elevation of my improved truck with one wheel removed.

Figure 2 represents a plan view.

Figure 3 represents a modified arrangement of the shafts.

Similar letters of reference indicate corresponding parts.

A represents the axle, which is preferably made of square form, and may be made in two parts, and arranged to be adjusted so as to be extended or contracted, for the purpose of varying the distance of the wheels apart when used for cultivating vegetables of various kinds, planted in rows of various distances apart.

B represents the shafts, the fronts of which are connected to the plow-beam or other implement, in a manner to be readily detached therefrom, which I propose to connect to the axle, by clips C, in a manner to admit the said shafts to be adjusted to shorten or lengthen them with reference to the said axle, or to be detached therefrom, for the substitution of a single shaft, having an enlarged bow, or yoke at the rear end, the two prongs of which are widely separated, to make room for the handles of the implement, and are attached to the axle by the clips, in the same manner.

D represents a support for the seat, in the form of a yoke, secured to the axle in a similar manner, by clips E, so that it may also be adjusted thereon, on which yoke the seat is suspended, as is clearly represented, and on which also are provided hooks F, to which stirrups H of leather, or other suitable material, may be attached, and which are also to be similarly attached to hooks I, on the shaft, near the cross-beam, whereby the operator may govern the depth of the running of the plow, by rising in his seat and throwing his weight upon the straps, which will cause the front end of the shafts to bear the plow-beam downward. It is only necessary, however, to employ this means in hard ground; for ordinary ground, the plow may be sufficiently guided by the handles.

K represents a cross-bar, for stiffening the shafts, and holding them in an extended condition, to afford room for the plow, and to operate it.

L represents other hooks attached to the shafts, for the connection of a shoulder-strap, M, which the operator carries over his shoulder, and whereby he may raise the truck off the ground, by rising off the seat and standing on the ground, for the purpose of turning around, and to transfer the truck and plow from one row to another.

The united front ends of the shafts B are attached to the beam by a swivel-bolt, in such a manner as to admit of readily detaching the truck, when not required for use, or for attaching to other implements; the said connection of the plow and the shafts B, being such, that each may have freedom to turn freely in either direction from a straight line.

By this arrangement, a truck is provided, which may be conveniently attached as well to harrows, drills, corn-droppers, &c., as to plows.

I am aware that the axle and clips are not new, in themselves considered, and I do not, therefore, claim them.

Having thus described my invention,

I claim as new, and desire to secure by Letters Patent—

1. The combination, with a truck, of the shoulder-strap M, substantially as and for the purpose described.

2. The combination, with the shafts B and the yoke D, of the hooks F I, and stirrups, substantially as and for the purpose described.

3. The arrangement of the yoke D, axle A, and the clips E, all substantially as and for the purpose described.

JOHN G. MOORE.

Witnesses:
JONATHAN SHERMAN,
ELIAS MOORE.